United States Patent Office 2,800,369
Patented July 23, 1957

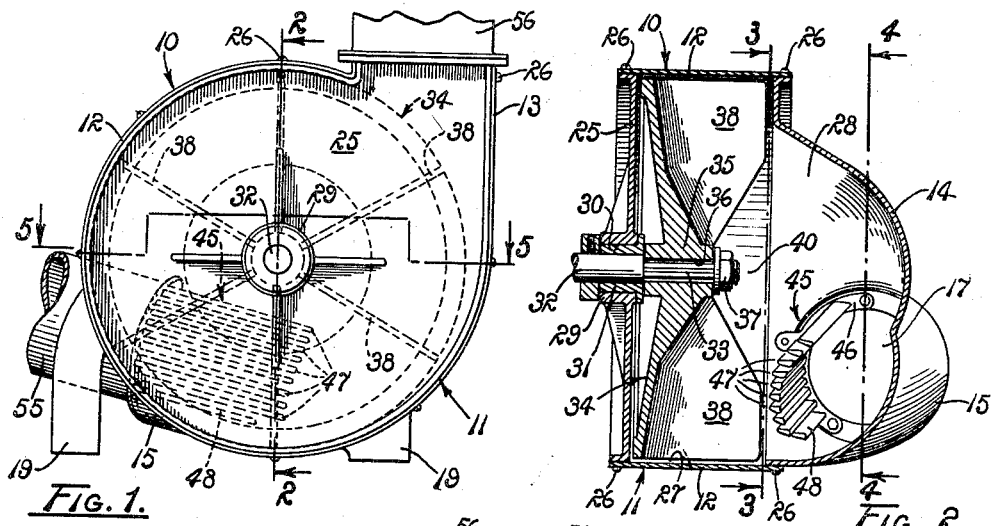

2,800,369

BLOWER GUARD

Raymond M. Snow, Fresno, Calif.

Application September 29, 1954, Serial No. 459,174

4 Claims. (Cl. 302—23)

The present invention relates to attachments for blowers and more particularly for blowers used in air conveyor systems for conveying such materials as cotton, grain, straw, ensilage and the like.

Air conveying systems such as those found in mechanical cotton pickers and in cotton gins are used to blow cotton through a system of conduits or pipes between a point of inlet and a point of discharge. In cotton pickers, the air conveyor consists of a blower fan providing inlet and oulet openings, an inlet pipe connected between the inlet opening and the bottom of a picking chamber and an outlet pipe connected between the inlet opening and the bottom of a picking chamber and an outlet pipe connected between the outlet opening and a basket. The blower draws the picked cotton up through the inlet pipe into the blower and discharges it into the outlet pipe for conveyance into the basket.

The blowers used for this purpose have conventional multi-bladed, rotary fans adapted to create a pressure differential between the inlet and outlet pipes. Such blowers have been the source of considerable trouble and not only have limited the usefulness of the conveyor system but have been the cause of serious dissatisfaction with mechanical cotton pickers in general.

The major disadvantage of conventional blowers arises from undue contact of the cotton with the fan blades or rotating parts of the blower. Cotton is drawn toward the axis of the fan blades and is drawn radially outwardly past the blades because of the pressure distribution established thereby. Leaves, seeds and other debris drawn into the blower with the cotton likewise travels in a winding path through the fan blades along with the cotton. This crushes or squeezes the leaves releasing chlorophyl and other discoloring material with the result that the cotton is discolored or soiled and its quality thereby lowered. Leaves that are drier tend to crumble and the resultant mixing of leaf particles with cotton fiber increases the difficulty of subsequent separation. Further, and of perhaps greater significance, the seeds are frequently cracked, hulled, or comminuted by contact with the fan blades and not only release coloring matter by oil and other impurities tending to lower the eventual cotton grade.

Large chunks of cotton often accumulate in the inlet pipe and are drawn in this condition into the blower. When such chunks are blown in between the fan blades, the additional load created thereby causes the fan to retard and to lose much of its blowing effectiveness. The described action can cause plugging of the fan or pipe and, if the load on the blades becomes excessive, shearing of the drive shaft for the blower. Additionally, one of the most common causes of plugging is cotton wrapping around the fan shaft.

Accordingly, it is an object of this invention to provide improvements in blower fans.

Another object is to minimize entanglement and contact of blown materials with the rotating parts of a blower fan.

Another object is to minimize plugging in air conveyor systems providing blower fans.

Another object is to provide a rotary blower for use in handling cotton adapted to prevent contact of cotton, leaves, seeds and the like with the rotating parts of the blower.

Another object is to provide an attachment for a rotary blower adapted to guide conveyed materials, such as cotton and the like, into areas within the blower of sufficient pressure to prevent their being drawn toward the rotary members of the blower.

Another object is to provide an attachment for a rotary blower usable in a cotton picker air conveyor system adapted to minimize cotton discoloration by crushing and rubbing of leaves against the cotton, to minimize seed cracking, hulling and bursting and to prevent plugging of such conveyor system by entanglement of the cotton with the rotating members of the blower.

Other objects are to provide an attachment for blowers as in the preceding paragraphs which is simple in construction, economical of manufacture, readily adaptable to conventional blowers and highly effective for its intended purpose.

These and other objects will become more fully apparent on reference to the following description.

In the drawings:

Figure 1 is an end elevation of a blower adapted for use in an air conveyor system for a cotton picker and having the present invention incorporated therein.

Figure 2 is a cross section through the blower of Figure 1 taken along lines 2—2 therein.

Figure 3 is a cross section through the blower taken along a plane indicated by lines 3—3 in Figure 2.

Figure 4 is a cross section through the blower taken along the plane indicated by line 4—4 of Figure 2.

Figure 5 is a horizontal cross section through the blower taken along line 5—5 of Figure 1.

Referring more particularly to the drawings:

A blower 10 is shown in Figure 1 and is representative of the type employed in an air conveyor system of a mechanical cotton picker. Since the details of such a cotton picker are well-known and form no specific part of this invention, other than illustrative environment, they have not been shown.

The blower 10 provides a housing 11 including a substantially cylindrical fan sheet 12 having a tangentially extended outlet neck portion 13. The housing also includes an outer end cover 14 which is endwardly bulged from the cylindrical sheet 12. The cover provides an inlet elbow 15 which is offset from the cylindrical sheet but which is substantially tangentially related thereto and an outlet neck portion 16 mating with and fitting against the outlet neck portion 13 of the sheet 12. The inlet elbow provides an inlet opening 17 of circular or other convenient shape. The neck portions 13 and 16 define an outlet opening 18 substantially tangential to the housing and axially displaced at substantially right angles from the inlet opening 16. Brackets 19 are provided on the housing for enabling mounting thereof.

A flat inner end plate 25 is also provided in the housing, oppositely disposed in spaced relation from the end cover 14. The cylindrical sheet 12 is connected to the end cover 14 and the plate 25 by a plurality of bolts, rivets or the like, indicated at 26. The housing formed in this manner defines a substantially cylindrical fan chamber 27 and a conveying chamber 28. It will be noted that the inlet opening 16 extends into the conveying chamber and the outlet opening 18 leads outwardly of the fan and conveying chambers.

The plate 25 is provided with a boss having a concentric opening 30 and a bearing 31 is fitted therein. A shaft 32 extends rotatably through the bearing sleeve and is provided with a splined end 33. A rotor 34 having a hub 35 providing a splined cylindrical bore 36 is mounted in the fan chamber with the hub fitted on the splined end of shaft 32 and a nut, as 37, threaded on the end of the shaft for holding the rotor thereon. The rotor provides a plurality of spaced radially extending blades 38 connected to the hub and disposed in the fan chamber.

By some suitable means, not shown, the rotor 34 is adapted to be energized, thereby enabling rotation of the blades within the fan chamber 27. This creates a distribution of air pressures within the housing 11 creating a suction at the inlet opening 17 for drawing material within the conveying chamber and discharging it out opening 18. As with rotary fans of this nature, the pressure adjacent to the axis of the fan in the area indicated at 40 is lower than at the tips of the blades 38. Thus, material entering the inlet opening will tend to be drawn toward the low pressure area 40 adjacent to the axis of the rotor and thence outwardly through the blades toward the outlet opening.

This invention is adapted to prevent such travel of conveyed material through the blower and to guide it along a path out of contact with the blades. Accordingly, a grid 45 is mounted within the conveying chamber 28 having an arcuate mounting strap 46 mounted around the inlet opening 16. A plurality of elongated fingers or bars 47 are integrally attached at one end to the mounting strap. These bars extend outwardly of the mounting strap in substantially perpendicular relation thereto being disposed in spaced parallel relation to each other. These bars, because of the arcuate nature of the mounting strap, collectively form an arcuate guide, or grid, separating the area adjacent the inlet opening from the central area 40 around the axis of rotor 34. The lowermost bar 48 is foreshortened somewhat from the other bars in the grid to prevent clogging of conveyed material between the lower wall of the conveying chamber and lowermost of such bars. Obviously, all of the bars are to be of such lengths as to fit conveniently within the conveying chamber to provide adequate space between the walls thereof and the bars.

Operation

The operation of this invention is believed to be readily apparent and is briefly summarized at this point. The blower fan 10 provided by this invention is especially adapted for use in an air conveyor system in a cotton picker mechanism. Briefly, this system picks up cotton at the bottom of the picking chamber, not shown, and due to the action of the fan carries it into a basket, not shown. The air conveyor system is generally provided with an inlet pipe 55 connected between the picking chamber and the inlet elbow 15 of the fan and an outlet pipe 56 connected between the outlet neck portions 13, 16 of the fan and discharge basket.

The fan is energized by any well known drive means whereby the rotor blades 38 rotate within the fan chamber 27. The distribution of air pressures is set up within the conveying chamber so as to draw cotton in through the inlet pipe 55 and the inlet opening 17 to the conveying chamber 28. As the cotton enters the inlet opening 17 the lower pressure area 40 adjacent to the axis of the rotor 34 tends to draw such cotton from the inlet opening toward the rotor. However, the grid 45 is mounted in such a position as to intercept the pieces of cotton being drawn toward the rotor and effectively blocks movement of the cotton in this direction. Since the grid is constructed of a plurality of spaced bars 47, it does not interfere with the establishment of air pressures within the conveying chamber in order to provide the desired suction.

Continued rotation of the rotor 34 draws the pieces of cotton along the bars 47 in their intended passage from the inlet opening 17 to the outlet opening 18 but in a path out of contact from the rotor blades 38. When the cotton reaches the outer ends of the bars it is out of the suction area adjacent to inlet opening 17 and into an area where the fan no longer acts to draw the cotton into area 40. Thus, the cotton is thrust radially against the walls of the conveying chamber 28 by the fan action annd is drawn in an upward direction toward the outlet neck portions 13 and 16 into the outlet opening 18 and outlet pipe 56. The grid 45 thus guides the cotton from the inlet opening to a position in the conveying chamber where tendency of the cotton to enter the rotor no longer exists. In this matter, there can be no contact of conveyed cotton with the rotor.

It will be apparent from the foregoing that an attachment for blowers of highly convenient, adaptable and effective design has been provided. Most conventional blowers can be equipped with such an attachment with a minimum of modification and yet, the intended attachment performs its intended function in a highly efficient manner. Since there is little or no contact of the conveyed material with the rotor blades, there can be no crushing, rubbing, squeezing, cracking, clogging, mixing or other undesirable action previously accompanying such fan operation.

Although the attachment has been described in connection with a cotton picking or ginning mechanism, it has many uses in fans employed in other environments. Further, the structure of the grid is not to be limited to the precise form and shape shown but other equivalent arrangements are to be included within the scope of this invention.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A blower comprising a housing defining a substantially cylindrical fan chamber and a material conveying chamber and having an inlet opening and an outlet opening at opposite ends of the conveying chamber, a fan rotatably mounted concentrically in the fan chamber in spaced relation axially of the chamber from the inlet opening for creating a suction adjacent to the inlet opening relative to the outlet opening, and a plurality of substantially straight fingers mounted in the housing adjacent to the inlet opening between the inlet opening and the fan and extended into the conveying chamber in chordal relation to the fan chamber toward the outlet opening, said fingers terminating adjacent to the fan substantially midway between opposite sides of the fan housing in the direction of chordal extension of the fingers.

2. A blower comprising a housing defining a fan chamber and a material conveying chamber and having an inlet opening and an outlet opening at opposite ends of the conveying chamber, a fan rotatably mounted in the fan chamber having a plurality of radially extended fan blades adapted to develop an air distribution of low and high pressures in the conveying chamber with the pressure at the inlet opening being relatively higher than the pressure adjacent to the axis of the fan, an annular mounting strap connected to the housing around the inlet opening thereof, and a plurality of elongated fingers integrally attached to the mounting strap extended outwardly thereof in closely spaced substantially parallel relation in the conveying chamber for permitting the passage of air and blocking the passage of conveyed material therethrough, the fingers collectively being adapted to guide such conveyed material through the area adjacent to the inlet opening to an area in the conveying chamber where the pressures developed by the fan carries the conveyed material to the outlet opening.

3. In a cotton picker providing an air conveyor system including a blower having a housing, the housing providing a substantially cylindrical fan chamber and an end cover defining a conveying chamber endwardly bulged from the fan chamber, the housing having inlet and outlet necks axially displaced at substantially right angles to each other and substantially tangentially related to the fan chamber, a multi-bladed rotary fan mounted in the housing for rotation in the fan chamber to create a low pressure area around the inlet opening and a minimum pressure area adjacent to the axis of the fan, a mounting strap connected to the housing adjacent to the inlet opening, and a plurality of elongated bars mounted on the strap extended outwardly therefrom in spaced substantially parallel relation into the conveying chamber between the rotary fan and the end cover adapted to permit the passage of air therethrough to block the passage of cotton from said low pressure area to said minimum pressure area, and to guide conveyed cotton through the conveying chamber to the outlet opening without contacting the rotary fan.

4. In a cotton picker providing an air conveyor system including a blower having a housing, the housing providing a substantially cylindrical fan chamber and an end cover defining a conveying chamber endwardly bulged from the fan chamber, the housing having inlet and outlet necks providing openings axially displaced at substantially right angles to each other and substantially tangentially related to the fan chamber, a multi-bladed rotary fan mounted in the housing for rotation in the fan chamber to create a lower pressure area around the inlet opening and a minimum pressure area adjacent to the axis of the fan, an arcuate mounting strap connected to the housing adjacent to the inlet opening, and a plurality of elongated bars mounted on the strap extended outwardly therefrom in spaced substantially parallel relation into the conveying chamber, the bars collectively defining an elongated arcuate grid positioned between the rotary fan and the end cover adapted to permit the passage of air therethrough and to guide conveyed cotton through the conveying chamber to the outlet opening without contacting the rotary fan.

References Cited in the file of this patent
UNITED STATES PATENTS

| | | |
|---|---|---|
| 1,346,282 | Tibbs | July 13, 1920 |
| 1,401,583 | Christoph | Dec. 27, 1921 |
| 1,627,608 | Keeney | May 10, 1927 |
| 2,389,533 | Nickla | Nov. 20, 1945 |
| 2,711,931 | Witt | June 28, 1955 |
| 2,719,057 | Yamper | Sept. 27, 1955 |